United States Patent
Daniels et al.

[11] Patent Number: 6,106,184
[45] Date of Patent: Aug. 22, 2000

[54] BOLT CONNECTOR WITH INTEGRAL BURR

[75] Inventors: Byron J. Daniels, Bethlehem, Pa.; Byron P. Horn, Hackettstown, N.J.

[73] Assignee: Frazier Industrial Company, Long Valley, N.J.

[21] Appl. No.: 08/968,365

[22] Filed: Nov. 12, 1997

[51] Int. Cl.⁷ .................................................. F16B 39/22
[52] U.S. Cl. ........................................ 403/282; 403/408.1
[58] Field of Search ............................ 403/258, 259, 403/260, 333, 334, 277, 282, 335, 337, 408.1; 411/399, 504, 501, 179, 180, 181, 237; 29/524, 432.1, 432.2, 432

[56] References Cited

U.S. PATENT DOCUMENTS

| | | | |
|---|---|---|---|
| 789,107 | 5/1905 | Steele | 411/399 X |
| 2,174,678 | 10/1939 | Young | 411/504 |
| 2,245,933 | 6/1941 | Moore | 411/504 |
| 2,302,772 | 11/1942 | Huck | 411/501 X |
| 3,382,637 | 5/1968 | Longinotti | 411/399 X |
| 4,253,776 | 3/1981 | Orain | 403/337 |
| 4,677,857 | 7/1987 | Feldmann | 403/282 X |
| 4,776,155 | 10/1988 | Fox et al. | 403/282 X |
| 5,573,345 | 11/1996 | Voss et al. | 403/334 X |
| 5,667,328 | 9/1997 | Hofle | 411/180 X |

*Primary Examiner*—Harry C. Kim
*Attorney, Agent, or Firm*—Joseph W. Molasky; Joseph W. Molasky & Associates

[57] ABSTRACT

A bolted connector for joining a pair of metal piece parts that exhibits improved stiffness is made by forming a burred aperture on one of the metal piece parts. The piece parts are configured to include bolt apertures with slightly different diameters, the piece part included the burred region comprising the lesser diameter. When the piece parts are joined, the burred region is forced into the second aperture. Once the pieces are joined, a threaded bolt is inserted through the first and second pieces and a nut is threaded onto the bolt shank to contact the underside of the second metal piece part. The burr functions as a physical "stop" within the second aperture and prevents relative motion between the piece parts.

4 Claims, 3 Drawing Sheets

BOLT CONNECTOR WITH INTEGRAL BURR

BACKGROUND OF THE INVENTION

1. Field of the Invention

The present invention relates to a connector for attaching two metal piece parts together and, more particularly, to a bolt connector with an integral burr configuration that provides for improved stiffness in the connection.

2. Description of the Prior Art

There are many well-known arrangements for attaching together metal sheets or a metallic framework structure. A relatively stiff and strong connection can be made by welding the piece parts together. In many instances, however, a weld is not appropriate. For example, when constructing a metal enclosure or rack structure, the arrangement must be capable of being dis-assembled and reconfigured (e.g., enlarged, lengthened, moved, etc.). In these instances, the metal piece parts must be bolted together.

There are a countless number of methods for bolting together metal assemblies which, after assembly, prevent relative movement between the bolted pieces. For example, this may be accomplished by restricting the size of the bolt holes in the members to be joined. In fact, in some instances, the bolt must actually be driven forcibly through the holes which offer no clearance over the basic bolt diameter, thereby resulting in an interference fit. It has been found that such an arrangement is successful if the bolt is a machined bolt, i.e., if the diameter over the threads is the same as the diameter of the shank of the bolt. However, in the case of bolts whose threads are rolled, the diameter over the threads is larger than the shank diameter. Consequently, when the holes in the members to be joined are sized to provide no clearance over the threads, there will be a resultant clearance with respect to the shank, since its diameter is smaller. Therefore, after the members have been joined, the interference fit that would otherwise prevent movement will be lost.

One solution to this problem is disclosed in U.S. Pat. No. 4,427,318 issued to E. G. Kaminski on Jan. 24, 1984. The '318 patent discloses a joint connection where one of the members is provided with a hollow deformable boss having inwardly sloping sidewalls which are configured to slip-fit partially within a cooperating aperture in the other member. The members are joined by a nut and bolt such that the boss moves outwardly and makes metal-to-metal contact with the other member and with the shank of the bolt. When the nut and bolt are released, the boss will relax into its original position. However, repeated use of the boss (that is, movement followed by relaxation) may eventually result in fatigue failure, shearing the boss from the metal member.

SUMMARY OF THE INVENTION

The present invention relates to a connector for attaching two flat metal piece parts together and, more particular, to a bolt connector with an integral burr configuration that provides for improved stiffness in the connection.

In an exemplary embodiment of the present invention, a burr region is formed around the perimeter of a first piece part by using a die and punch. The diameter of the die is chosen to be greater than the diameter of the punch, resulting in the formation of a slight lip, or burr, around the perimeter of the piece part. This burred piece part is then mated with a second metal piece part such that the burr engages an aperture in the second piece part. The aperture in the second metal piece part is designed to be slightly larger than the burred aperture so that a sufficient amount of the burr will protrude into the second aperture. A conventional threaded bolt and nut assembly is then used to join the pieces. The burr will act as a "stop" within the second aperture and prevent slippage between the piece parts. In one arrangement, the burr is formed to completely surround the perimeter of the aperture in the first piece part. In an alternative arrangement, separate symmetrical burr sections (for example, a pair of sections) may be used. It has been found that a pair of symmetrically disposed burr sections is sufficient to increase the stiffness in the connection.

Various other features of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION OF THE PREFERRED EMBODIMENTS

Figure 1:
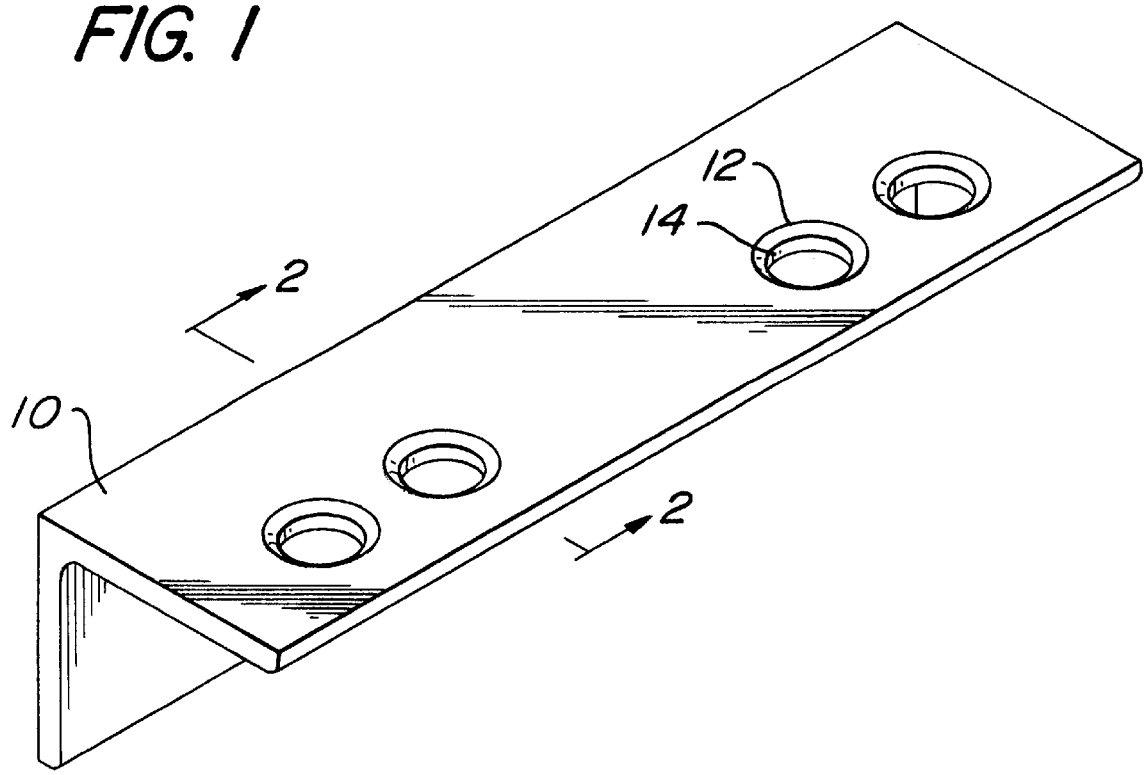
FIG. 1 illustrates an exemplary metal piece part including a set of integral burr connectors formed in accordance with the present invention.
Figure 2:
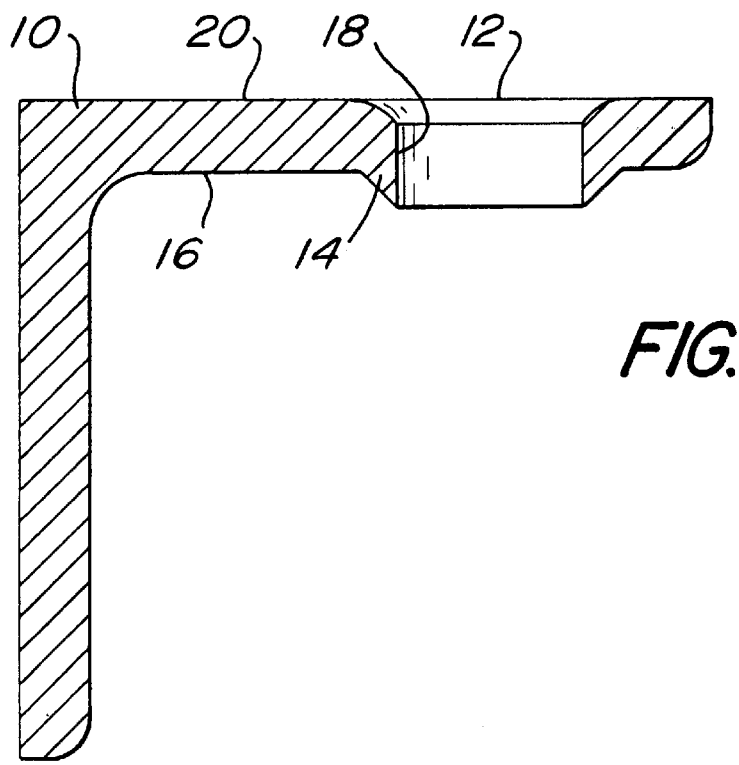
FIG. 2 contains a side view in perspective of the piece part of FIG. 1, taken along line 2—2.

FIG. 1 illustrates an exemplary metal piece part 10 including a plurality of burred apertures 12 formed in accordance with the teachings of the present invention. Although piece part 10 is illustrated as comprising an L-shaped member, it is to be understood that the burred connector arrangement of the present invention may be used to join any two metal piece parts together; the geometry of the piece parts is irrelevant to the connector arrangement of the present invention. Each aperture 12 is formed to include an integral burr section 14. As clearly visible in the cut-away side view of FIG. 2, each aperture is formed to include a burred connection area 14 that extends downward beyond bottom surface 16 of piece part 10. Aperture 12 is cylindrical in form and includes an essentially flat inner surface 18 for accepting the shank of a threaded bolt (not shown in this view). Aperture 12 may include a top recessed portion, as shown in FIG. 2. However, such a recess is not required.

Figure 3:
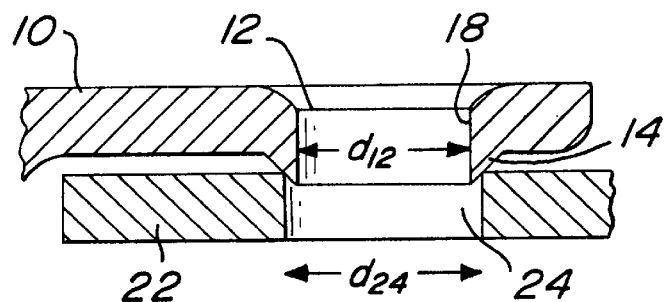
FIG. 3 illustrates an initial joining of a pair of metal piece parts using the integral burr connector of the present invention.

When connecting two metal piece parts using the integral burr configuration of the present invention, the burred side of the aperture is brought into direct contact with the piece part to be mated. Referring to FIG. 3, a second metal piece part 22, including an aperture 24, is coupled to first metal piece part 10, where burred connector region 14 is disposed to protrude into aperture 24. It is to be noted that the diameter of aperture 12, denoted as $d_{12}$, is slightly less than the diameter, $d_{24}$, of aperture 24. The difference in diameter will control the degree to which burred section 14 protrudes into aperture 24 when mated.

Figure 4:
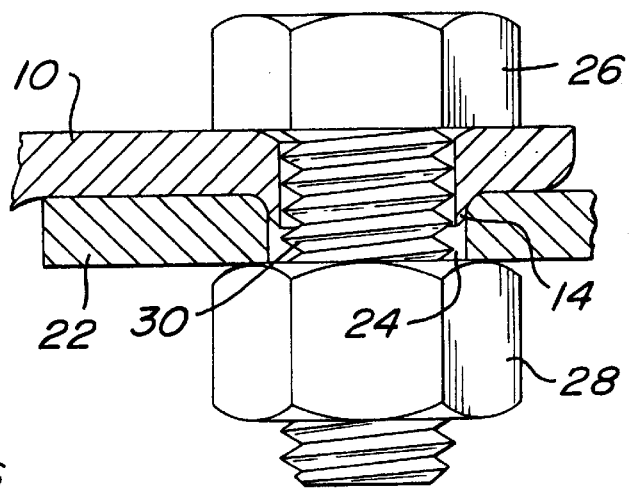
FIG. 4 illustrates a final connection of two metal piece parts, using a threaded bolt and nut to complete the attachment.

FIG. 4 illustrates an exemplary burred connector arrangement including a threaded bolt 26 and nut 28 that have been used to complete the attachment. The action of threading bolt 26 through apertures 12 and 24, in association with the tightening of bolt 28 against piece part 22 will maintain the metal piece parts in physcial contact, ensuring that burr 14 remains positioned within aperture 24. As long as burr 14 is wihtin aperture 24, slippage between plates 10 and 22, as indicated by the arrows in FIG. 4, will be prevented; burr 14 will act as a physcial stop and prevent moveemnt of first metal piece part 10 with respect to second metal piece part 22.

Figure 5:
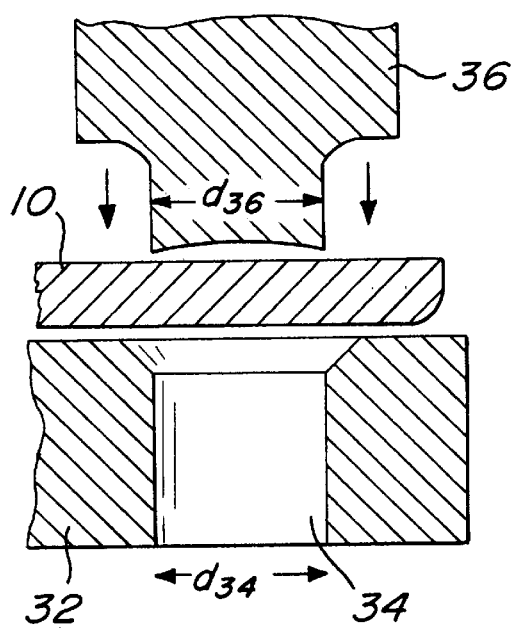
FIG. 5 illustrates an exemplary arrangement for forming an integral burr connector using an oversized die and punch.
Figure 6:
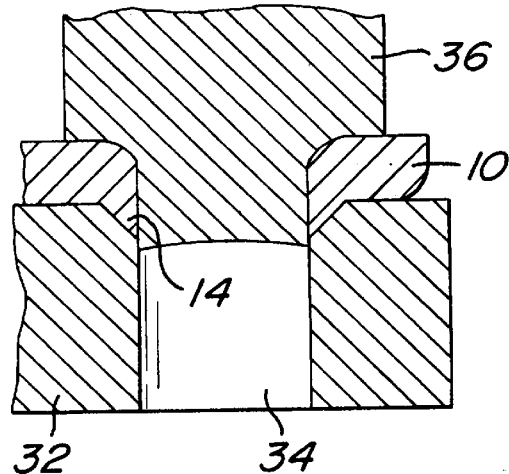
FIG. 6 illustrates the oversized die and punch subsequent to forming a burr on a metal piece part.

As mentioned above, the piece parts can be dis-assembled, releasing the force on the burr so that it will return to the geometry as shown in FIG. 3. Therefore, various piece parts including such a burred connector can be mated, dis-assembled, and re-joined in an alternative configurations as necessary An exemplary method of forming the burred connector of the present invention is illustrated in FIGS. 5 and 6. Referring to FIG. 5, a first metal piece part 10 is processed using a die and punch to create the burred aperture 12. An exemplary die 32 is formed to include an oversized aperture 34 with respect to the diameter of an associated punch 36. That is, the diameter $d_{34}$ of aperture 34 is configured to be greater than the diameter $d_{36}$ of punch 36. In one exemplary embodiment, the die may comprise an aperture of approximately ¹¹⁄₁₆" and the punch may have a width of approximately ½". To form the burred aperture, metal piece part 10 is interposed between die 32 and punch 36, where punch 36 is forced downward through piece part 10, as indicated by the arrows in FIG. 5. FIG. 6 illustrates punch 36 fully engaged with metal piece part 10. Evident in this view is the formation of aperture 12 including relatively flat inner surface 18 and burred region 14.

Figure 7:
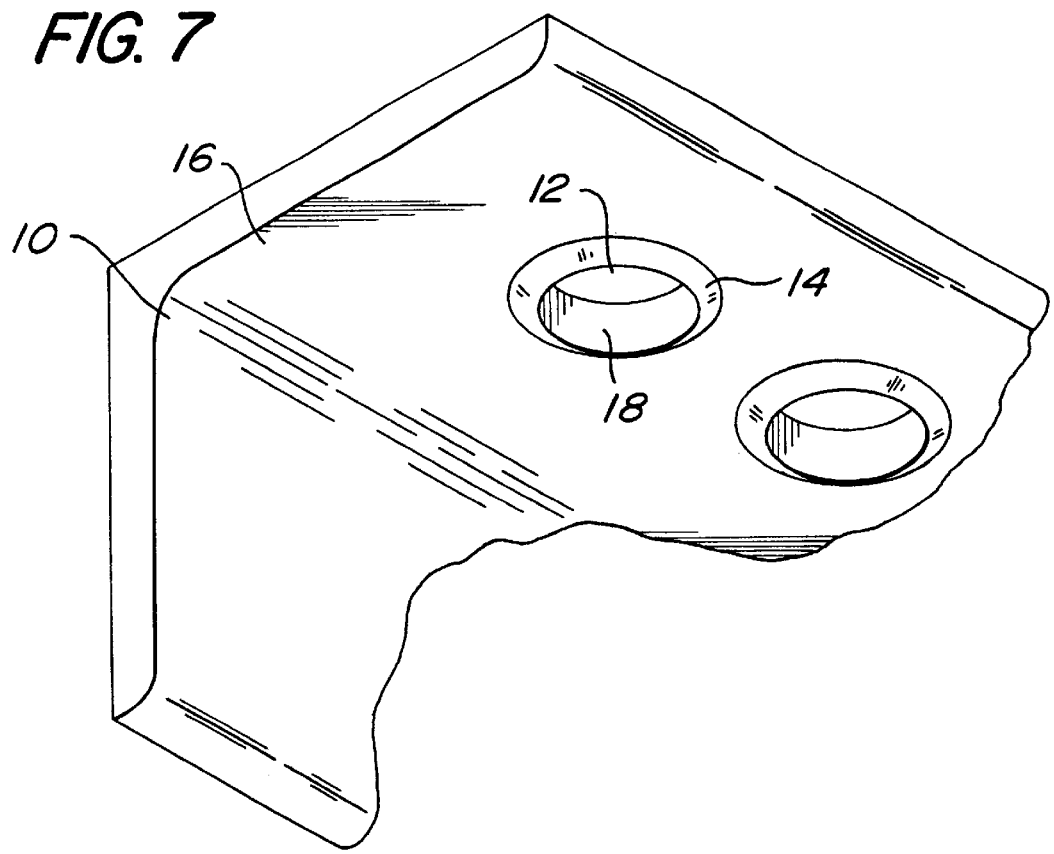
FIG. 7 is an inside partial view of the metal piece part of FIG. 1, illustrating an exemplary burr formed to completely surround the associated aperture.
Figure 8:
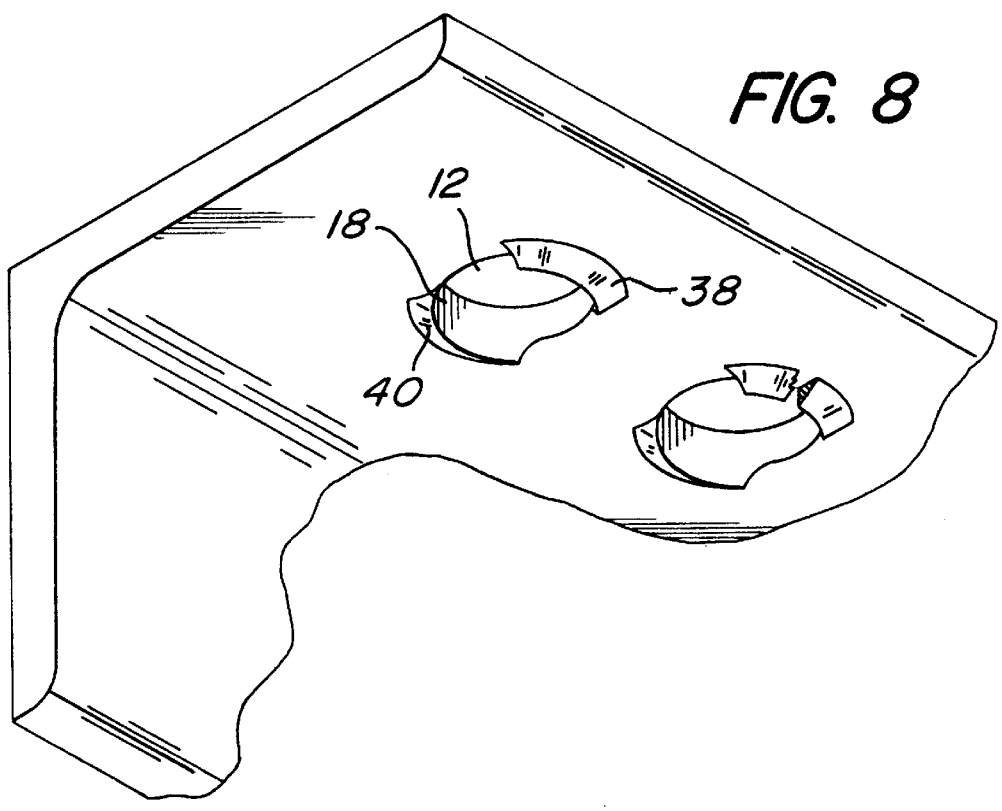
FIG. 8 is an inside partial view of an alternative arrangement wherein the exemplary burr is formed as two separate sections formed along opposite sides of the associated aperture perimeter.

A perspective view of a plurality of burred apertures 12 formed using the die and punch arrangement is shown in FIG. 7. In particular, FIG. 7 is a view of bottom surface 16 of metal piece part 10. Clearly shown in this view is the formation of burred region 14 formed so as to completely surround aperture 12. The flat inner surface 18 of aperture 12 can also be seen. As mentioned above, it is not required that the burred region be formed to completely surround the aperture. FIG. 8 illustrates an alternative burred connector arrangement of the present invention. In this case, a pair of burred sections 38 and 40 are formed along the longitudinal side areas of aperture 12. As long as the sections are symmetrically formed, the attachment between the pair of metal piece parts will be sufficiently stiff. Alternatively, a set of three or four burred regions may be used. In general, any symmetrically disposed arrangement of burred regions will deform upon tightening and fill the gap between the second aperture and the threaded shank.

What is claimed is:

1. A bolted connection comprising:

a first metal piece part formed to include an aperture having a first predetermined diameter and comprising a relatively flat inner surface, said aperture including a preformed burr connection region around the perimeter thereof;

a second metal piece part formed to include an aperture having a second predetermined diameter greater than the first predetermined diameter of the first metal piece part aperture, said second metal piece part having no burr connection region;

a threaded bolt disposed through the first and second metal piece parts such that the burr region of the first metal piece part protrudes into the second metal piece part aperture; and a nut attached to said threaded bolt and said second metal piece part in a manner such that the threading of the nut on the bolt deforms the burr connection region to contact an extended portion of both the second metal piece part aperture and the threaded bolt.

2. A bolted connection as defined in claim 1 wherein the burr region is formed to completely surround the perimeter of the first metal piece part aperture.

3. A bolted connection as defined in claim 1 wherein the burr region is formed to include a plurality of regions disposed symmetrically on portions of the perimeter of the first metal piece part aperture.

4. A bolted connection as defined in claim 3 wherein the plurality of burr regions comprises a pair of symmetrically disposed regions.

* * * * *